United States Patent Office 3,763,121
Patented Oct. 2, 1973

3,763,121
TRANSPARENT AND THERMOPLASTIC
COPOLYMERS OF ACRYLONITRILE
Karl-Erwin Schnalke, Cologne, Ibrahim Abdel Aziz El Sayed, Schildgen, and Carlhans Süling, Odenthal-Hannenberg, Germany, assignors to Bayer Aktiengesellschaft, Leverkusen, Germany
No Drawing. Filed Apr. 19, 1972, Ser. No. 245,641
Claims priority, application Germany, Apr. 21, 1971, P 21 19 213.2
Int. Cl. C08f 15/40
U.S. Cl. 260—80.81
2 Claims

ABSTRACT OF THE DISCLOSURE

Terpolymers having an overall composition representing a monomer content of 50–75% by weight of acrylonitrile, 23 to 48% by weight of vinyl acetate and 2 to 20% by weight of pyropylene, the monomers being substantially statistically distributed are obtained by polymerisation in an aqueous emulsion. The terpolymers can be processed into fibres, filaments and extruded mouldings.

---

This invention relates to terpolymers of acrylonitrile, vinyl acetate and propylene which are suitable for use as extrusion compositions, and to a process for their production. More particularly, the invention relates to terpolymers in which the (bound) acrylonitrile predominates.

Polymers with a high acrylonitrile content, i.e. more than 50% by weight of acrylonitrile, are extremely difficult to process into transparent mouldings. As the acrylonitrile content increases, the thermoplasticity of such products is drastically reduced, whilst any increase in temperature promotes inter alia yellowing and, in some cases, even browning, make polymers of this kind unsuitable for a number of applications. Accordingly, products with special combinations of monomers of the kind described, for example, in German Offenlegungsschrifts Nos. 1,957,324 and 2,007,519, lend themselves to thermoplastic processing. Because of their composition, however, this type of product tends to cloud and become opaque (so-called white failure) when subjected to bending or along edges, and this reduces their general serviceability.

The production of copolymers of acrylonitrile and vinyl acetate containing approximately 85% of acrylonitrile and more has also been known for some time and, in general, can be carried out without any difficulties. Copolymers of this kind which contain small quantities of vinyl acetate are used for the production of acrylic fibres. By contrast, the copolymerisation of acrylonitrile or vinyl acetate with propylene, for example in an aqueous medium, is not easy to carry out. In the processes disclosed in U.S. patent specification No. 3,156,675, British patent specification No. 946,052 and DAS No. 1,221,802, radical copolymerisation only takes place in the presence of certain catalyst systems which bind the polar monomer, acrylonitrile or vinyl acetate, to form complexes and hence greatly modify the activity of this monomer towards polymerisation. One disadvantage common to these processes is that polymerisation can only be carried out in a solvent of the kind which does not attack hydrolysis-sensitive catalyst components. In addition, the copolymers thus obtained contain alternating blocks of homopolymers in a way which is independent of the ratio of the monomers provided. Further, the properties of such products cannot be modified or adapted to suit particular requirements by changing the monomer composition.

Where as it is possible to radically copolymerise ethylene with vinyl acetate in almost any quantitatives ratio, considerable difficulties are encountered in applying this reaction to propylene. Thus, U.S. patent specification No. 2,421,971 describes the radical copolymerisation of vinyl acetate and propylene in which less than 30% of the quantity of propylene provided is incorporated in the polymer. Due to the strong chain-transfer effect of propylene, the copolymers obtained have low average molecular weights and properties of limited technical value.

Although acrylonitrile and ethylene can be copolymerised to a limited extent at high pressures, polymers of this kind have never been used commercially. Although the production of an acrylonitrile-propylene copolymer in toluene by means of a radical initiator is described in Isvest. akad. Nauk, U.S.S.R., Otdel. Khim. Nauk., 8 (1959), p. 1507, no particulars are given as to the yield and the molecular weight obtained.

Polymers with a high acrylonitrile content have several valuable properties which make such a product interesting such as increased solvent resistance, increased strength and reduced permeability to such gases as $CO_2$, $N_2$ or $O_2$. However, since polyacrylonitrile decomposes before reaching its melting point, it is only possible to use a more or less greatly modified acrylonitrile copolymer as, for example, an extrusion composition. In general, an acrylonitrole content greater than 40% by weight is avoided because, in cases where larger quantities of acrylonitrile are used, the polymers produced begin to change under extrusion conditions and heavy discolouration, degradation and crosslinking reactions make such products unsuitable for commercial use.

The object of the present invention is to provide thermoplastically processible acrylonitrile copolymers which do not have any of the aforementioned disadvantages. Another object of the invention is to provide a simple process for producing these copolymers.

This object is achieved by copolymerising acrylonitrile, vinyl acetate and propylene in specific quantitative ratios, in which the proportion of acrylonitrile predominates, in an aqueous emulsion.

Accordingly, the invention relatives to a process for the production of a copolymer of acrylonitrile, in which:

|  | Parts by weight |
|---|---|
| (A) Acrylonitrile | 45–70 |
| (B) Vinyl acetate | 30–55 |
| (C) Propylene | 3–30 | are polymerised in an aqueous emulsion in the presence of a radical-forming water-soluble initiator at a temperature of from 10 to 100° C. and at a pressure above atomospheric pressure.

It is preferred to use

|  | Parts by weight |
|---|---|
| (A) Acrylonitrile | 55–65 |
| (B) Vinyl acetate | 35–45 |
| (C) Propylene | 8–20 | for the copolymerisation.

Under the conditions specified, copolymerisation of the monomers leads to a soluble, transparent and thermoplastic moulding composition of copolymerised monomers, the overall composition of which is 50 to 75% by weight of acrylonitrile, preferably 55 to 70% by weight, 23 to 48% by weight of vinyl acetate, preferably 25 to 35% by weight, 2 to 20% by weight of propylene, preferably 5 to 15% by weight, the monomers being substantially statically distributed, and having a K-value according to Fikentscher of from 45 to 110, as measured in dimethylformamide. The invention also relates to the moulding compositions of these copolymers.

In carrying out the copolymerisation reaction, it is advantageous to maintain the pressure in the reaction vessel at the particular reaction temperature substantially constant during the copolymerisation by addition of propylene.

Copolymerisation is carried out at a pressure above atmospheric pressure, for example at a pressure of from 2 to 200 atmospheres, and preferably at a pressure of from 4 to 60 atmospheres.

It is also particularly advantageous to introduce the initiator solution, acrylonitrile and vinyl acetate into an aqueous emulsion containing propylene and to maintain the pressure of propylene at a constant level both during this addition and during the polymerisation reaction.

Suitable initiators include water-soluble peroxy compounds and water-soluble redox systems, preferably potassium or ammonium peroxydisulphate or hydrogen peroxide, in combination with a reducing agent, such as sodium pyrosulphite, sodium bisulphite, Rongalite, the sodium salt of benzene sulphinic acid or water-soluble amines, for example triethanolamine, which acts as an accelerator.

The quantity of catalyst used is within the limits considered normal for polymerisation reactions of this kind, i.e. between 0.01 and 5% by weight, based on the total monomer.

To influence the molecular weight the usual regulators such as long-chain alkyl mercaptans, diisopropyl xanthogenate, nitro compounds, or organic halogen compounds, may be provided during the polymerisation reaction.

The polymerisation temperature is governed by the activation system used, and is in the range of from 10 to 100° C., preferably from 40 to 90° C.

The copolymerisation process according to the invention can be carried out either continuously or as a batch process using known emulsion polymerisation methods as described in detail, for example, in "Methoden der organischen Chemie," Houben-Weyl, vol. 14/1, 1961, pp. 133–390.

Suitable emulsifiers include anionic, cationic and non-ionic emulsifiers or combinations thereof.

Suitable anionic emulsifiers include higher fatty acids, resinic acids, acid sulphuric acid esters of fatty alcohols, higher alkyl sulphonates, alkyl-aryl sulphonates, sulphonated castor oil, sulphosuccinic acid esters and water-soluble salts of sulphonated ethylene oxide adducts.

Examples of cationic emulsifiers include salts of quaternary ammonium and pyridinium compounds.

Suitable non-ionic emulsifiers include the known reaction products of ethylene oxide with long-chain fatty alcohols or phenols, the reaction products of more than 10 mols of ethylene oxide with 1 mol of a fatty alcohol or phenol being particularly suitable.

The aforementioned emulsifiers can be used in a total quantity of from 0.1 to 20% by weight, based on the total monomer. They are preferably used in a total quantity of from 0.5 to 5% by weight.

The polymer latex obtained can be precipitated by known methods either by addition of salt solutions or by low-temperature coagulation. Adjustment of the molecular weight to that required for extrusion and of the melt viscosity to a favourable value is carried out, if necessary, as already described, by the addition of known regulating compounds such as mercaptans or disulphides.

The product obtained, generally in powder form, can be granulated and processed in extruders. The polymers can, of course, also be processed into fibres and filaments by known dry-spinning or wet-spinning techniques, or films may be drawn from solutions thereof.

Extruded mouldings of the aforementioned terpolymers show extremely favourable mechanical properties. They are transparent having little or no colour. The slight yellowing which occurs at high extrusion temperatures can readily be compensated by addition of suitable dyes. If desired, stabilisers, plasticisers, fillers or pigments can be added to the moulding compositions before they are extruded.

The percentages quoted in the examples are percentages by weight, unless otherwise stated. The K-values were determined in dimethylformamide at 25° C. (cf. Fikentscher, Cellulosechemie, 13, p. 58 (1932)).

EXAMPLE 1

A 40-litre autoclave equipped with a stirring mechanism is filled with:

| | |
|---|---:|
| Deionised water _____ml__ | 18,000 |
| Sodium salt of lauryl sulphate _____g__ | 60 |
| Sodium acetate _____g__ | 45 | and flushed 3 times with nitrogen.

600 g. of propylene are then introduced and the temperature adjusted to 65° C.

The following constituents are then introduced simultaneously over a period of 6 hours:

(a)

| | |
|---|---:|
| Deionised water _____ml__ | 5,000 |
| Potassium peroxydisulphate _____g__ | 54 |

(b)

| | |
|---|---:|
| Deionised water _____ml__ | 5,000 |
| Sodium pyrosulphite _____g__ | 60 |

(c)

| | |
|---|---:|
| Acrylonitrile _____g__ | 3,600 |
| Vinyl acetate _____g__ | 1,800 |
| Dodecylmercaptan _____g__ | 3 |

After all the components have been added, the mixture is stirred for 10 hours at 65° C. During the addition of the reaction solution and during stirring, the initial pressure in the autoclave (15 atms) is maintained by the addition of propylene (22 g.). 34,000 g. of a copolymer latex are obtained which has a solids content of 16%. The latex is coagulated by the addition of aluminium sulphate solution.

According to analysis, the overall polymer composition represents a monomer content of:

| | Percent |
|---|---:|
| Acrylonitrile _____ | 66.8 |
| Vinyl acetate _____ | 25.4 |
| Propylene _____ | 7.8 |

The K-value in dimethylformamide (DMF) is: 82.7.

The material is dried at 50° C., granulated and then processed in a screw extruder at 180° C. into mouldings which were found to have the following mechanical properties.

Dimensional stability under heat (° C.):

| | |
|---|---|
| According to Martens, DIN 53,458 | 59 |
| According to Vicat, DIN 53,460 | 86 |
| Impact strength, kp. cm./cm.$^2$, DIN 53,453: | |
| At 25° C. | 60 |
| At −40° C. | 32 |
| Notched impact strength, kp. cm./cm.$^2$, DIN 53,453 at 25° C. | 3 |
| E-modulus, kp./cm.$^2$ | 40,600 |
| Bending tension, 6 B$_f$ kg./cm.$^2$, DIN 53,452 | 1,400 |
| Ball indentation hardness, kp./cm.$^2$, DIN 53,456: | |
| 30″ | 1,860 |
| 60″ | 1,860 |

EXAMPLE 2

The following components were introduced into a 40-litre autoclave equipped with a stirring mechanism:

| | | |
|---|---|---|
| Deionised water | ml | 16,200 |
| Sodium salt of lauryl sulphate | g | 54 |
| Sodium acetate | g | 30 |
| Propylene | g | 1080 |

The contents of the autoclave are then heated to 65° C., and the following solutions then introduced over a period of 4 hours:

(a)

| | | |
|---|---|---|
| Deionised water | ml | 4,500 |
| Potassium peroxydisulphate | g | 48 |

(b)

| | | |
|---|---|---|
| Deionised water | ml | 4,500 |
| Sodium pyrosulphite | g | 54 |

(c)

| | |
|---|---|
| Acrylonitrile | 3,240 |
| Vinyl acetate | 1080 |

After all the components have been introduced, the mixture is stirred for 10 seconds at 65° C. During the introduction of the reaction solutions and during stirring, the initial pressure in the autoclave at 65° C. (21 atms.) is maintained by the addition of propylene (28 g.). A polymer latex is obtained (30,700 g.) which has a solids content of 15.2% the latex is coagulated with the aluminum sulphate solution.

According to analysis, the overall polymer composition represents a monomer content of:

| | Percent |
|---|---|
| Acrylonitrile | 70.6 |
| Vinyl acetate | 16.2 |
| Propylene | 13.2 | and has a K-value in DMF of 75.7.

A moulding produced from the aforementioned copolymer is found to have the following mechanical properties.

Dimensional stability under heat, ° C.:

| | |
|---|---|
| According to Martens | 58 |
| According to Vicat | 85 |
| Impact strength, kp./cm./cm.$^2$, DIN 53,453: | |
| At 25° C. | 60 |
| At −40° C. | 34 |
| Notched impact strength, kp. cm./cm.$^2$, DIN 53,453 at 25° C. | 3 |
| E-modulus, kp./cm.$^2$ | 40,100 |
| Bending tension, 6 B$_f$, kp./cm.$^2$, DIN 53,452 | 1,600 |
| Ball indentation hardness, kp./cm.$^2$, DIN 53,456 | 1,890 |

EXAMPLE 3

A 12-litre-capacity autoclave equipped with a stirring mechanism is filled with:

5,000 ml. of deionised water,
20 g. of a reaction product of 1 mol of nonyl phenol and approximately 10 mols of ethylene oxide, and
5 g. of sodium acetate, and flushed 3 times with nitrogen. 30 g. of propylene are then introduced and the contents of the autoclave heated to 65° C. The following components are then introduced simultaneously over a period of 4 hours:

(a)

| | | |
|---|---|---|
| Deionised water | ml | 1,000 |
| Potassium peroxydisulphate | g | 15 |

(b)

| | | |
|---|---|---|
| Deionised water | ml | 1,000 |
| Triethanolamine | g | 5 |

(c)

| | | |
|---|---|---|
| Acrylonitrile | g | 670 |
| Vinyl acetate | g | 300 |
| Diisopropylxanthogenic acid disulphide | g | 0.2 |

The procedure is then as described in Example 1. The initial pressure in the autoclave (4.3 atms.) is kept constant throughout the copolymerisation by the addition of 8 g. of propylene. 8,000 g. of a latex with a solids content of 12.1% are obtained, the latex being coagulated with aluminium sulphate solution.

According to analysis, the overall polymer composition represents a monomer content of:

| | Percent |
|---|---|
| Acrylonitrile | 71 |
| Vinyl acetate | 25.6 |
| Propylene | 3.4 | and has a K-value in DMF of 109.8.

A moulding was found to have the following mechanical properties.

Dimensional stability under heat, ° C.:

| | |
|---|---|
| According to Martens | 61 |
| According to Vicat | 89 |
| Impact strength, kp. cm./cm.$^2$ DIN 53, 453: | |
| At 25° C. | 47 |
| At −40° C. | 25 |
| Notched impact strenght, kp. cm./cm.$^2$, DIN 53, 453 at 25° C. | 2.9 |
| E-modulus, kp./cm.$^2$ | 51,100 |
| Bending tension, 6 B$_f$, kp./cm.$^2$, DIN 53, 452 | 1,535 |
| Ball indentation hardness, kp./cm.$^2$, DIN 53, 456 | 2,250 |

EXAMPLE 4

| | G. |
|---|---|
| Propylene | 50 |
| Acrylonitrile | 650 |
| Vinyl acetate | 300 | are copolymerised under the conditions described in Example 3. The initial pressure (6 atms.) is kept constant throughout the copolymerisation by addition of propylene (12 g.). 8,000 g. of copolymer latex with a solids content of 11.6% are obtained, the latex being coagulated with aluminium sulphate solution.

According to analysis, the overall polymer composition represents a monomer content of:

| | Percent |
|---|---|
| Acrylonitrile | 71 |
| Vinyl acetate | 23.4 |
| Propylene | 5.6 |

The K-value in DMF is 77.6.

A moulding was found to have the following mechanical properties.

Dimensional stability under heat, ° C.:
  According to Martens _____ 60
  According to Vicat _____ 87
Impact strength, kp. cm./cm.², DIN 53, 453:
  At 25° C. _____ 48
  At −40° C. _____ 29
Notched impact strength, kp. cm./cm.² at 25° C.,
  DIN 53, 453 _____ 2.9
E-modulus, kp./cm.² _____ 47,600
Bending tension, 6 $B_f$, kp./cm.², DIN 53, 452 __ 1,495
Critical bending tension _____ 2,250

What is claimed is:

1. Soluble, transparent, thermoplastic moulding compositions having an overall composition representing a monomer content of 50 to 75% by weight of acrylonitrile, 23 to 48% by weight of vinyl acetate and 2 to 20% by weight of propylene, said monomers being substantially statistically distributed and said moulding compositions having K-values of from 110 to 45 in dimethylformamide.

2. The compositions of claim 1 having an overall composition representing a monomer content of 55 to 70% by weight of acrylonitrile, 25 to 35% by weight of vinyl acetate and 5 to 15% by weight of propylene.

References Cited
UNITED STATES PATENTS
3,560,461   2/1971   Yonezu _____ 260—87.3

JOSEPH L. SCHOFER, Primary Examiner

S. M. LEVIN, Assistant Examiner

U.S. Cl. X.R.

260—32.6 N